(12) United States Patent
Jiang et al.

(10) Patent No.: US 12,103,882 B2
(45) Date of Patent: Oct. 1, 2024

(54) A/O TOWER INTEGRATED DEVICE FOR BIOLOGICAL TREATMENT OF ORGANIC SEWAGE CONTAINING COD AND NITROGEN AND METHOD BY USING THE SAME

(71) Applicant: ZHEJIANG HAIHE ENVIRONMENTAL TECHNOLOGY CO., LTD., Zhejiang (CN)

(72) Inventors: Jingwei Jiang, Jinhua (CN); Fangfang Bao, Jinhua (CN); Zhenghai Jiang, Jinhua (CN)

(73) Assignee: ZHEJIANG HAIHE ENVIRONMENTAL TECHNOLOGY CO., LTD., Jinhua (CN)

( * ) Notice: Subject to any disclaimer, the term of this patent is extended or adjusted under 35 U.S.C. 154(b) by 384 days.

(21) Appl. No.: 17/645,035

(22) Filed: Dec. 17, 2021

(65) Prior Publication Data
US 2022/0112112 A1     Apr. 14, 2022

Related U.S. Application Data

(63) Continuation-in-part of application No. PCT/CN2020/112774, filed on Sep. 1, 2020.

(30) Foreign Application Priority Data

Aug. 18, 2020   (CN) .......................... 202010832009.4

(51) Int. Cl.
*C02F 9/00*     (2023.01)
*C02F 1/00*     (2023.01)
(Continued)

(52) U.S. Cl.
CPC ................ *C02F 9/00* (2013.01); *C02F 1/004* (2013.01); *C02F 3/006* (2013.01); *C02F 3/301* (2013.01);
(Continued)

(58) Field of Classification Search
CPC .. G03F 7/702; G03F 7/70233; G03F 7/70258; C02F 1/004; C02F 2209/08;
(Continued)

(56) References Cited

U.S. PATENT DOCUMENTS 6,210,578 B1    4/2001   Sagastume et al.

FOREIGN PATENT DOCUMENTS

| CA | 2481853 A1 | 4/2006 | |
| CN | 101732975 A * | 6/2010 | ............. B01D 53/80 |

(Continued)

OTHER PUBLICATIONS

Translation of Jiang (CN-109020071-A) (Year: 2018).*
(Continued)

*Primary Examiner* — Ekandra S. Miller-Cruz

(57) ABSTRACT

The present disclosure provides an A/O tower integrated device for biological treatment of organic sewage containing COD and nitrogen, comprising a cylinder; a water distributing zone, a filtrating zone, a three-phase contact aerobic zone, a nitrification liquid reflux discharging zone and an anoxic zone are successively arranged in the cylinder from top to bottom; the three-phase contact aerobic zone is the non-ponding zone and the atmospheric high oxygen biofilm filling zone; the sewage inlet is set in anoxic zone; the water outlet of the anoxic zone is connected with the water inlet of the water distributing zone. The device integrates water distribution, filtration, aerobic and anoxic, thus saving occupied zone. The pollutant removal load per unit volume of the device is high; the aerobic zone can coordinately deal with the odor generated in the anoxic zone; the removal rates of COD, ammonia nitrogen and total nitrogen are high.

15 Claims, 2 Drawing Sheets

(51) Int. Cl.
*C02F 3/00* (2023.01)
*C02F 3/30* (2023.01)

(52) U.S. Cl.
CPC .......... *C02F 3/302* (2013.01); *C02F 2209/08* (2013.01); *C02F 2209/14* (2013.01); *C02F 2209/15* (2013.01)

(58) Field of Classification Search
CPC .............. C02F 2209/14; C02F 2209/15; C02F 2305/06; C02F 3/006; C02F 3/043; C02F 3/301; C02F 3/302; C02F 9/00; Y02W 10/10; Y02W 10/00; Y02W 30/00; Y02W 90/00
USPC ........................................................ 210/614
See application file for complete search history.

(56) References Cited

FOREIGN PATENT DOCUMENTS

| CN | 103922545 | A | | 7/2014 | |
|---|---|---|---|---|---|
| CN | 204958521 | U | | 1/2016 | |
| CN | 207313239 | U | | 5/2018 | |
| CN | 109020071 | A | | 12/2018 | |
| CN | 208454618 | U | | 2/2019 | |
| CN | 208829499 | U | | 5/2019 | |
| CN | 110217928 | A | * | 9/2019 | ............... C02F 9/10 |
| CN | 210711172 | U | | 6/2020 | |
| CN | 111547868 | A | * | 8/2020 | ............. C02F 3/109 |
| CN | 212315868 | U | | 1/2021 | |
| CN | 213865815 | U | | 8/2021 | |

OTHER PUBLICATIONS

Translation of Liu(CN-110217928-A) (Year: 2019).*
Translation of Wang (CN-111547868-A) (Year: 2020).*
Translation of Jijun (CN 101732975) (Year: 2010).*
International Search Report in PCT/CN2020/112774 mailed on May 20, 2021, 8 pages.
Written Opinion in PCT/CN2020/112774 mailed on May 20, 2021, 9 pages.

* cited by examiner

A/O TOWER INTEGRATED DEVICE FOR BIOLOGICAL TREATMENT OF ORGANIC SEWAGE CONTAINING COD AND NITROGEN AND METHOD BY USING THE SAME

CROSS-REFERENCE TO RELATED APPLICATIONS

This application is a continuation-in-part of International Application No. PCT/CN2020/112774, filed on Sep. 1, 2020, which claims priority of Chinese Patent Application No. 202010832009.4, filed on Aug. 18, 2020, the entire contents of which are hereby incorporated by reference.

TECHNICAL FIELD

The present disclosure belongs to the technical field of sewage biological treatment, and particularly relates to an A/O tower biological treatment integrated device for organic sewage containing COD and nitrogen and method by using the same.

BACKGROUND

A large amount of organic sewage is often produced in the production and domestic life of urban and rural areas. These organic sewage usually contains pollutants such as carbon and nitrogen. When organic sewage is treated, it is necessary to remove these pollutants so that the sewage can meet the discharge standards. In order to reduce the environmental pollution caused by organic water, it is particularly important to remove the above pollutants efficiently.

Therefore, it is desirable to provide a reliable and improved treatment device and corresponding treatment method, which can better remove pollutants in organic sewage.

SUMMARY

In view of this, the purpose of the present invention is to provide an A/O tower biological treatment integrated device and method for organic sewage containing COD and nitrogen, which integrates functions of anoxia, water distribution, filtration, aerobic and precipitation, and has high pollutant removal efficiency.

The present disclosure provides an A/O tower biological treatment integrated device for organic sewage containing COD and nitrogen, comprising a cylinder;

a water distributing zone, a filtrating zone, a three-phase contact aerobic zone, a nitrification liquid reflux discharging zone and an anoxic zone are successively arranged in the cylinder from top to bottom;

the three-phase contact aerobic zone is a non-ponding zone and an atmospheric pressure high oxygen biofilm filling zone;

a sewage inlet arranged in the anoxic zone;

a water outlet of the anoxic zone is connected with the water inlet of the water distributing zone;

the three-phase contact aerobic zone comprises a vortex air supply zone and an aerobic zone arranged directly above the vortex air supply zone;

a low-pressure fan is arranged on the cylinder wall of the vortex air supply zone to provide low-pressure air for the vortex air supply zone through an air inlet;

the vortex air supply zone is communicated with the nitrification liquid reflux discharging zone.

Preferably, the device further comprises a precipitated clear water discharging unit; the precipitated clear water discharging unit is provided with a sludge discharging port and a sludge discharging pipe connected with the discharging port;

the sludge discharging pipe is provided with an excess sludge discharging port and a reflux sludge control valve; the reflux sludge control valve convey that reflux sludge to the water distributing zone together with the sewage treat in the anoxic zone;

the precipitated clear water discharging unit is arranged in the cylinder and is located between the nitration liquid reflux discharging zone and the anoxic zone; or arranged outside the cylinder;

part of the nitration liquid in the nitration liquid reflux discharging zone is discharged into the precipitated clear water discharging unit.

Preferably, if the precipitated clear water discharging unit is arranged outside the cylinder;

the nitration liquid reflux discharging zone in that cylinder comprises a nitration liquid collecting tank;

a nitration liquid discharging port and an exhaust hole arranged at the bottom of the nitration liquid collecting tank; the nitration liquid discharging port is connected with a nitration liquid guiding pipe; the exhaust hole discharges the air generated in the anoxic zone to the vortex air supply zone;

and a nitrification liquid diversion well communicated with the nitration liquid diversion pipe, wherein the lower part of the nitrification liquid diversion well is provided with a nitration liquid reflux port and a nitration liquid discharging port;

the nitration liquid reflux port is communicated with the anoxic zone; and the nitration liquid discharging port is connected to the water inlet of the precipitated clear water discharging unit outside the cylinder through a pipeline.

Preferably, if the precipitated clear water discharging unit is arranged in the cylinder, the nitration liquid reflux discharging zone in the cylinder comprises a nitration liquid collecting tank;

an exhaust-nitrification liquid draft tube 17-1 and a central guide cylinder 19-1 are arranged at the bottom of the nitration liquid collecting tank;

the exhaust-nitrification liquid draft tube discharges the air in the anoxic zone to the vortex air supply zone and delivers part of nitration liquid into the precipitated clear water discharging unit through the central guide cylinder;

another part of nitration liquid in the nitration liquid reflux discharging zone flows back to the anoxic zone through the exhaust-nitrification liquid draft tube 17-1 passing through the precipitated clear water discharging unit.

Preferably, the filtrating zone is a granular filtration layer of quartz sand, ordinary sand or granular activated carbon filter material with a particle size of 3-50 mm and a thickness of 50-300 mm; or a mesh filter orifice plate or a porous filter orifice plate.

Preferably, if the precipitated clear water discharging unit is arranged in the cylinder, the inner wall of the cylinder of the precipitated clear water discharging unit is provided with an annular overflow tank;

the outer wall of the cylinder corresponding to the annular overflow tank is provided with a clear water discharging port.

The present disclosure provides a method for treating urban and rural domestic sewage by using the integrated device of the above technical scheme, comprising the following steps:

the urban and rural domestic sewage is treated in the anoxic zone, and the water is distributed after the outlet water is lifted and transported, and then discharged through filtration, aerobic treatment, nitrification liquid reflux discharge and sludge precipitation reflux clean water discharge in turn to obtain the treated sewage.

Preferably, for anoxic treatment, the concentration of anoxic bacterial sludge is 15-30% V/V; the dissolved oxygen concentration is 0.2-0.6 mg/L; the residence time is 3-8 h, and the concentration of denitrification carbon source is controlled at a C/N ratio is 3:1-5:1.

For aerobic treatment, the density of the filler used in the aerobic zone is 50-60% V/V; the air pressure in the air supply zone is 50-1000 Pa; the nitrification liquid reflux ratio is 2.0:1-3.0:1.

Preferably, the organic wastewater containing COD and nitrogen to be treated includes one or more kinds of organic waste water containing COD and nitrogen generated by towns, rural zones, agglomerations and industries.

The present disclosure provides an integrated device for an A/O tower biological treatment integrated device and method for organic sewage containing COD and nitrogen, comprising a cylinder; a water distributing zone, a filtrating zone, a three-phase contact aerobic zone, a nitrification liquid reflux discharging zone and an anoxic zone are successively arranged in the cylinder from top to bottom; the three-phase contact aerobic zone is a non-ponding zone and an atmospheric pressure high oxygen biofilm filling zone; a sewage inlet is arranged in the anoxic zone; the water outlet of the anoxic zone is connected with the water inlet of the water distributing zone. The device integrates water distribution, filtration, three-phase contact aerobic, nitrification liquid reflux discharge and hypoxia, thus saving the occupied zone. The pollutant removal rate of the device is high; the aerobic zone can coordinately deal with the odor generated in the anoxic zone. The removal rate of COD, ammonia nitrogen and total nitrogen is high.

DETAILED DESCRIPTION OF THE EMBODIMENTS

The present disclosure provides an integrated device for treatment of organic sewage (also referred to as the integrated device or device in short). The integrated device for treatment of organic sewage is an A/O tower integrated device for biological treatment of organic sewage containing COD and nitrogen. The integrated device includes:

a water distributing zone, a filtrating zone, a three-phase contact aerobic zone, a nitrification liquid reflux discharging zone and an anoxic zone; wherein the anoxic zone is set with a sewage inlet, and the outlet of the anoxic zone is communicated with the water distributing zone; and the three-phase contact aerobic zone is a non-ponding zone and an atmospheric pressure high oxygen biofilm filling zone.

The present disclosure provides an integrated device for treatment of organic sewage, including cylinder;

a water distributing zone, a filtrating zone, a three-phase contact aerobic zone, a nitrification liquid reflux discharging zone and an anoxic zone are arranged from top to bottom in the cylinder;

the three-phase contact aerobic zone is a non-ponding zone and an atmospheric pressure high oxygen biofilm filling zone;

the sewage inlet is arranged at the anoxic zone;

the outlet of the anoxic zone is communicated with the inlet of the water distributing zone.

The device integrates water distribution, filtration, three-phase contact aerobic, nitrification liquid reflux discharge and anoxia, thus saving the occupied zone. The pollutant removal rate of the device is high. Aerobic zone coordinately disposes odor produced in anoxic zone; the removal rate of COD, ammonia nitrogen and total nitrogen is high.

Figure 1:
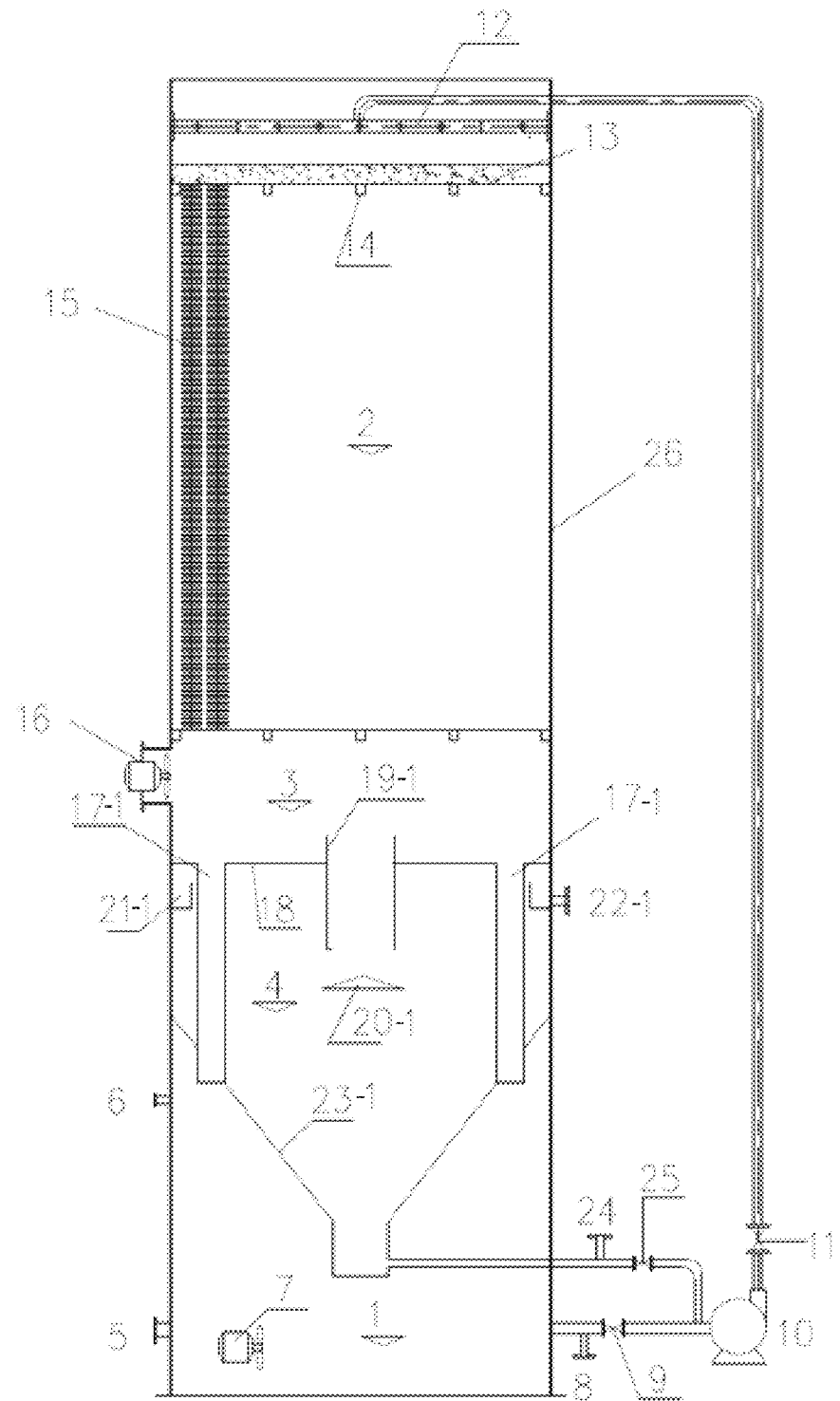
FIG. 1 is a schematic diagram of an A/O tower biological treatment integrated device for efficiently treating urban and rural sewage according to some embodiments of the present disclosure, in which, 1: anoxic zone, 2: aerobic zone, 3: vortex air supply zone, 4: precipitation zone, 5: water inlet, 6: carbon source feeding port, 7: submersible agitator, 8: sampling detection port, 9: anoxic flow control valve, 10: lift pump, 11: main lift valve, 12: water distribution pipe, 13: filtration system, 14: filler support, 15: filler, 16: low-pressure fan, 17-1: exhaust-nitrification liquid draft tube, 18: nitration liquid collecting tank, 19-1: central guide cylinder, 20-1: conical water baffle, 21: annular overflow tank, 22-1: clear water discharging port, 23-1: conical sludge settling shaker, 24: excess sludge discharging port, 25: reflux sludge control valve, and 26: cylinder.
Figure 2:
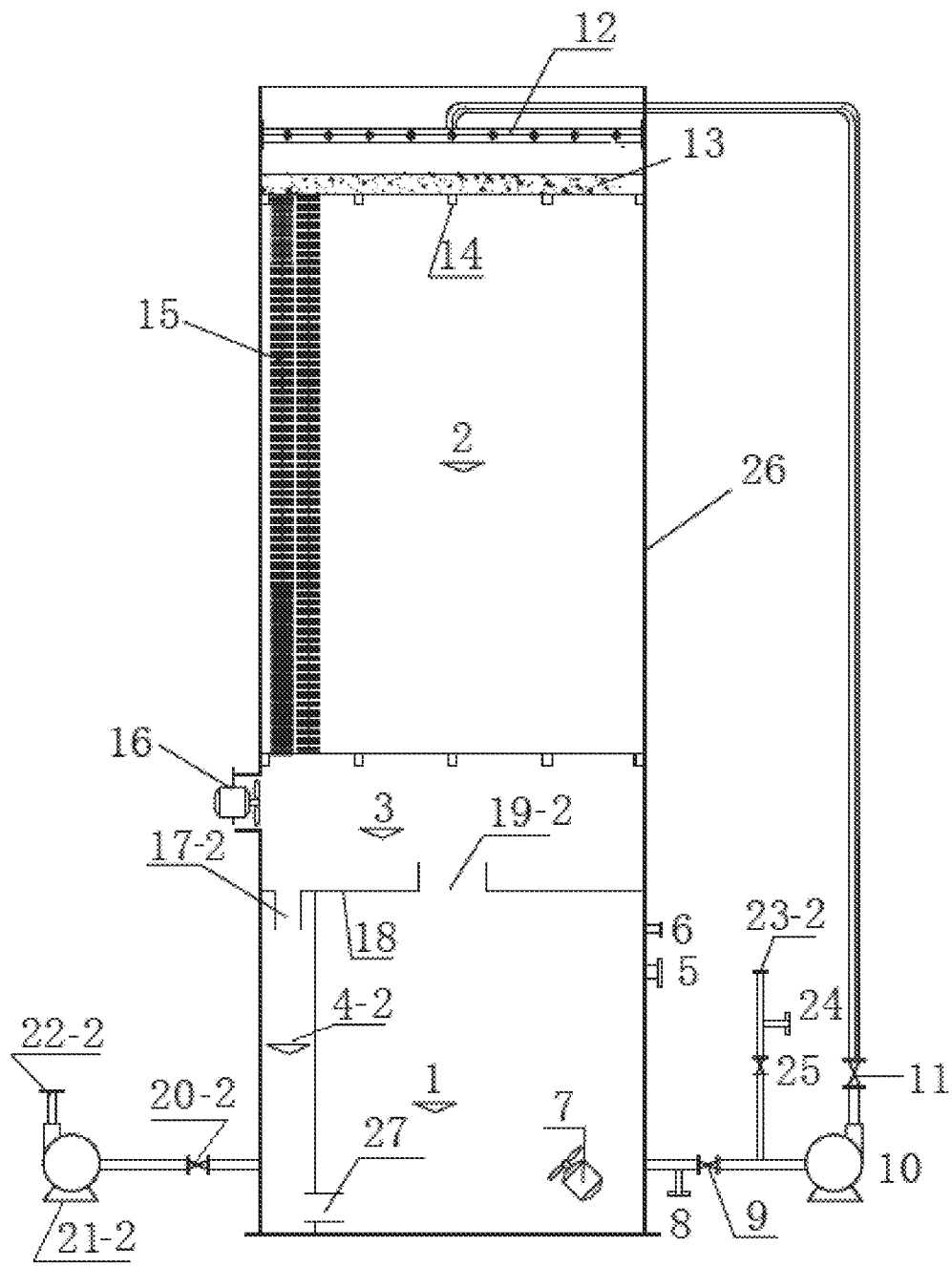
FIG. 2 is a schematic diagram of another A/O tower biological treatment integrated device for efficiently treating urban and rural sewage according to some embodiments of the present disclosure, in which, 4-2: nitration fluid diverting well, 17-2: nitration fluid guiding pipe, 19-2: exhaust hole, 20-2: nitration fluid reflux control valve, 21-2: nitration fluid lift pump, 22-2: precipitation tank inlet, 23-2: sludge discharging port of precipitation tank, and 27: nitration fluid reflux port. The denotations of other numbers are the same as those in FIG. 1.

Referring to FIG. 1 and FIG. 2, FIG. 1 is a schematic diagram of an A/O tower biological treatment integrated device for urban, rural, industrial and other organic sewage provided by the present disclosure; FIG. 2 is another schematic diagram of A/O tower biological treatment integrated device for urban, rural, industrial and other organic sewage provided by the present disclosure.

In some embodiments, the anoxic zone is arranged at a lower part of the integrated device. In the anoxic zone:

a. organics, which are non-degradable under anoxic conditions, are hydrolyzed into small molecule easily degradable organics;

b. organic nitrogen in sewage is converted into ammonia nitrogen, and the reaction formula is as follows:

ammoniation of organic nitrogen under anoxic condition:

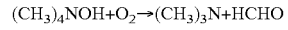
$(CH_3)_4NOH+O_2 \rightarrow (CH_3)_3N+HCHO$

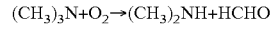
$(CH_3)_3N+O_2 \rightarrow (CH_3)_2NH+HCHO$

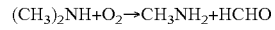
$(CH_3)_2NH+O_2 \rightarrow CH_3NH_2+HCHO$

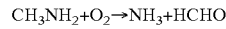
$CH_3NH_2+O_2 \rightarrow NH_3+HCHO$ c. the nitrate nitrogen returned from the three-phase contact aerobic zone to the nitrification solution in the anoxic zone is converted into nitrogen with denitrifying bacteria under anoxic conditions. The reaction formula is as follows:

Denitrifying Bacteria

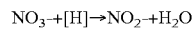
$NO_3^-+[H] \rightarrow NO_2^-+H_2O$

Denitrifying Bacteria $$NO_2^- + [H] \rightarrow N_2 \uparrow + H_2O$$

d. the effluent from the anoxic zone and the sludge returned from the sludge precipitation return clean water discharge zone are lifted and pumped to the water distributing zone;

e. the odor, nitrogen and other air generated in the anoxic zone are discharged to the air supply zone of the three-phase contact aerobic zone through the exhaust pipe penetrating the precipitation zone;

f. the carbon source to be added in the anoxic zone is loaded through the carbon source feeding port 6.

The anoxic zone 1 includes an anoxic tank. A mixing device for preventing sludge precipitation, namely a submersible mixer 7, is installed at the bottom of the anoxic tank. The submersible mixer 7 may be an underwater mixing pump, a submersible mixer or a hydraulic mixer.

The anoxic zone is provided with a sewage inlet 5. The anoxic tank is provided with a carbon source feeding port 6.

In some embodiments, an automatic monitoring device for COD, dissolved oxygen, nitrate nitrogen and ammonia nitrogen may be arranged at the bottom of the anoxic zone as required. A sampling detection port is arranged on the anoxic pool; the detection port is used as a monitoring port or on-line monitor for determining ammonia nitrogen, nitrate nitrogen, COD and DO.

The anoxic zone and the water distributing zone are connected through a pipeline, and a lifting device for lifting sewage is arranged on the pipeline. The lifting device includes a lift pump 10 and a main lift valve 11.

In some embodiments, the water outlet of the anoxic zone is communicated with the water inlet of the water distributing zone; the lift pump 10 lifts the sewage treated in the anoxic zone to the water distributing zone through a pipeline. The pipeline between the water outlet of the anoxic zone and the lift pump is provided with a sampling detection port 8 and an anoxic flow control valve 9.

In some embodiments, the water distributing zone is located at the top of the A/O tower. The water distributing zone includes a water distributing device; the water distributing device makes the sewage drip evenly to the filtering zone on the water inlet plane. The water distributing device may be an indented water distributing tank, a perforated water distribution pipe, a water spray faucet, or a rotary perforated pipe water distributor. The perforation diameter of the perforated water distribution pipe 12 is 5-30 mm, and the perforation spacing is 100-300 mm; the vertical height of the water outlet of the water distributing device from the filtering zone is preferably 200-800 mm.

After passing through the water distributing zone, the sewage flows to the filtrating zone. The filtering zone is arranged between the water distributing zone and the three-phase contact aerobic zone; the filtering zone can filter the blocks, particles and floating objects in the sewage to prevent the system from blocking. The filtering zone includes a filtering system 13, which is selected from a particle filter layer of quartz sand, ordinary sand or granular activated carbon filter material with particle size of 3-50 mm and thickness of 50-300 mm, mesh filter orifice plate, or porous filter orifice plate.

The three-phase contact aerobic zone is arranged between the filtrating zone and the nitrification liquid reflux discharging zone; the three-phase contact aerobic zone is a non-ponding zone and an atmospheric pressure high oxygen biofilm filling zone. The oxygen concentration of the three-phase contact aerobic zone is 23-26%; and the pressure is 50-1000 Pa. The dissolved oxygen concentration in the ponding aerobic zone of the prior art is 6-7 Mg/L, and the pressure is 40000-70000 Pa.

The three-phase contact aerobic zone includes a three-phase contact aerobic zone comprising a vortex air supply zone 3 and an aerobic zone 2 which is arranged directly above the vortex air supply zone; the cylinder wall of the vortex air supply zone is provided with a low-pressure fan 16, which provides low-pressure air for the vortex air supply zone through an air inlet. The vortex air supply zone is communicated with the nitrification liquid reflux discharging zone.

In some embodiments, the three-phase contact aerobic zone also includes an automatic monitoring device for nitrated liquid ammonia nitrogen for monitoring the ammonia nitrogen concentration in the sewage treated in the anoxic zone. For example, indophenol blue-automatic microplate reader or other methods may be used for determination. In some embodiments, the automatic monitoring device for nitrated liquid ammonia nitrogen may be arranged in the aerobic zone directly above the vortex air supply zone.

The three-phase contact aerobic zone has the following functions:

a. Absorbing and degrading organic matters in sewage: organic matters are absorbed by membrane aerobic organisms attached to the biological filler as nutrient. Membrane aerobic organisms need to continuously provide oxygen needed in the breathing process to generate activity, and in the oxygen-enriched state, the activity of aerobic organisms may be greatly improved. At the same time, the absorption and degradation rate of organic pollutants may be improved. When the device runs, the biofilms attached to the filler surface are all exposed in the air, and the sewage containing biological strains are in contact with the biofilms in a dripping state from top to bottom. The muddy strains in the sewage drops and the biofilms attached to the filler can obtain the oxygen needed for breathing by absorbing oxygen in the air and dissolved oxygen in the water layer on the biofilm surface, which is the mass transfer process of air, liquid and solid contact, making the biofilms obtain the oxygen needed for breathing. Since the oxygen content in the air is about 25% and the solubility of oxygen in water is only 6.84 mL/L, the oxygen content of the former is significantly higher than that of the latter. The oxygen-enriched state produced by air and thin layer water on the surface of biofilm which are directly contacting with the organisms and microorganisms in biofilm can greatly increase the number and activity of the organisms and microorganisms in unit volume of the treatment device, and can cultivate more dominant strains with large oxygen consumption, strong biological activity and strong pollutant degradation ability, thus increasing the pollutant removal load per unit volume of the treatment device. The air is input from bottom to top by the low-pressure fan or fan located at the bottom of the tower, and can also be input naturally by the pores of the permeable cylinder;

b. Nitrification: ammonia nitrogen is nitrated into nitrate nitrogen under the action of aerobic biological bacteria, and the reaction formula is as follows:

$$NH_4^+ + O_2 + HCO_3^- \rightarrow NO_2^- + C_5H_7O_2N + H_2O + H_2CO_3$$

$$NO_2^- + NH_4^+ + H_2CO_3 + HCO_3^- + O_2 \rightarrow C_5H_7O_2N + NO_3^-;$$

c. The reflux function of nitration liquid and the shunt function of discharging into precipitation tank: the nitration liquid flowing out from the nitration liquid collecting tank at the bottom of the vortex air supply zone in this zone flows into the anoxic zone at the bottom of the tower in a gravity flow way, and the other flows into the subsequent precipitated clear water discharging unit in a gravity flow or pump lifting way. The reflux ratio is adjusted by the nitration liquid reflux control valve, and the ratio of the reflux water amount to the water amount entering the precipitation zone is 1-3;

d. Deodorization: malodorous air and nitrogen generated from the anoxic zone at the bottom enter the air supply zone of the three-phase contact aerobic zone through the exhaust pipe of the precipitation zone, and then flow to the aerobic three-phase contact zone for biological deodorization. Therefore, no malodorous air is discharged from the top of the tower, which is a preferred and most environmentally-friendly deodorization technology;

e. The vortex air supply zone is provided with a low-pressure fan 16; the low-pressure fan supplies air, and the air pressure of the fan is 50-1000 Pa, which is a process with low energy consumption. One or more low-pressure fans installed on the peripheral wall of the device continuously input compressed air into the air supply zone of the three-phase contact aerobic (O) process, and the air supply zone forms a swirling flow, and the compressed air in the air supply zone passes through the cavities between biofilms and water droplets in the biological contact oxidation zone and then is discharged at the upper part. The technical indexes are as follows: the air pressure is 50-1000 Pa, and the ascending velocity of compressed air is 5 mm/s-100 mm/s; control method: according to the measured dissolved oxygen index of nitration solution, control the number of fans or the air speed of fans to adjust the air supply volume. Oxygen required for aerobic biological strain breathing in the device is obtained by continuously conveyed air. The low-pressure air is mixed with odor and nitrogen from the anoxic process to form a swirling flow in the air supply chamber. The pressure difference between the air supply chamber and the contact zone of aerobic biological strain flows through the air chamber between biofilms, and the excess oxygen-containing air and exhaust are discharged from the top of the tower. The oxygen supply system is not equipped with an aerator or aeration pipe.

The inner upper part of the three-phase contact aerobic zone is provided with filler supports 14 installed in parallel up and down; the support is made of firm non-aging metal, plastic, nylon and other materials, and the spacing between two adjacent supports is 100-200 mm. Fillers 15 with upper and lower vertical, fixed at both ends, high specific surface zone and used for attaching biofilm are installed between the supports, and the installation spacing of adjacent fillers is 50-200 mm. The installation of the filler layer may be made into modules in advance and assembled on site; the three-phase contact aerobic zone may be installed as the single-layer or multi-layer; the height of the filler layer is 3000-15000 mm. The installation of the filler adopts the support binding type or layered stacking type. The support binding type is to fix the filler on the strip made of plastic, nylon or metal and other materials with good firmness and low scalability, and then fix the upper and lower ends of several strips bound with the filler on the additional support respectively to form the filler layer; the layered stacking type is to stack the massive filler directly on the bottom, and a mesh support with a pore size smaller than the filler particle size is set, which may be combined by multiple filler layers.

The peripheral wall structure of the tower body of the three-phase contact aerobic zone: the zone runs in a non-ponding state in the cylinder, and thus there is no need of lateral pressure resistance and seepage prevention, and the peripheral wall only needs to be assembled by common or heat-insulating plates made of corrosion-resistant metals and plastics, and fixed by welding, embedded bolts in concave-convex grooves and the like.

One or several low-pressure fans are arranged on the cylinder wall of the vortex air supply zone, and the air pressure of the low-pressure fans is 50-1000 Pa, and the air volume is determined according to the treatment capacity. A nitration liquid collecting tank 18 is arranged at the bottom of the vortex air supply zone; the nitration liquid collecting tank is arranged in a planar manner; the tank depth of the nitration liquid collecting tank is 100-500 mm.

The device also includes a precipitated clear water discharging unit. The precipitated clear water discharging unit is provided with a sludge discharging port and a sludge discharging pipe connected with the discharge port; the sludge discharging pipe is provided with an excess sludge discharging port and a reflux sludge control valve; the reflux sludge control valve conveys the reflux sludge to the water distributing zone together with the sewage treated in the anoxic zone; the precipitated clear water discharging unit is arranged in the cylinder and is located between the nitration liquid reflux discharging zone and the anoxic zone; or the unit is arranged outside the cylinder; and part of the nitration liquid in the nitration liquid reflux discharging zone is discharged into the precipitated clear water discharging unit. The precipitated clear water discharging unit carries out mud-water separation on the mud-water mixture from the nitration liquid collecting tank by adopting a precipitation method, and the obtained clear water is discharged; part of the obtained precipitated sludge is dewatered and dried by a sludge drying device, and part of the sludge is refluxed and merged into a water outlet pipe of the anoxic zone. According to the present disclosure, the sludge reflux ratio is controlled by the sludge reflux valve 25, and the sludge reflux amount/clear water discharge amount is equal to 0.3:1-0.8:1. Excess sludge is discharged through the excess sludge discharging port 24.

In some embodiments, if the precipitated clear water discharging unit is arranged outside the cylinder, the nitration liquid reflux discharging zone includes a nitration liquid collecting tank;

a nitration liquid discharging outlet and an exhaust hole 19-2 are arranged at the bottom of the nitration liquid collecting tank; the nitration liquid discharging outlet is connected with a nitration liquid diversion pipe 17-2; the exhaust hole 19-2 discharges the air generated in the anoxic zone to the vortex air supply zone; and a nitrification liquid diversion well 4-2 communicated with the nitration liquid diversion pipe, wherein a nitration liquid reflux port 27 and a nitration liquid discharging port are arranged at the lower part of the nitrification liquid diversion well;

the nitration liquid reflux port is communicated with the anoxic zone; and the nitration liquid discharging port is connected to the water inlet of the precipitated clear water discharging unit through a pipeline.

A nitrification liquid reflux control valve 20 is arranged on the pipeline from the nitrification liquid outlet to the water inlet 22 of the precipitation tank. Nitrification liquid is discharged to the precipitation tank through nitrification liquid lift pump 21.

In some embodiments, if the precipitated clear water discharging unit is arranged in the cylinder, the nitration liquid reflux discharging zone in the cylinder includes a nitration liquid collecting tank 18, an exhaust-nitrification liquid draft tube 17-1 and a central guide cylinder 19-1 arranged at the bottom of the nitration liquid collecting tank.

The exhaust-nitrification liquid draft tube 17-1 discharges the air in the anoxic zone to the vortex air supply zone and sends part of nitration liquid to the precipitated clear water discharging unit through the central guide cylinder; and another part of nitration liquid in the nitration liquid reflux discharging zone flows back to the anoxic zone through the exhaust-nitrification liquid draft tube 17-1 passing through the precipitated clear water discharging unit.

The precipitated clear water discharging unit may be arranged in the same tower body between the three-phase contact aerobic zone and the anoxic zone as required, or may be arranged outside the tower body; operation is carried out by sewage inflow lifting sludge self-reflux or sewage self-flowing sludge lifting reflux. If the precipitated clear water discharging unit is arranged in the cylinder, the inner wall of the cylinder of the precipitated clear water discharging unit is provided with an annular overflow groove 21-1; the outer wall of the barrel corresponding to the annular overflow tank is provided with a clear water discharging port 22-1. A serrated overflow port is arranged above the annular overflow tank; a cone-shaped sludge settling shaker 23-1 is arranged below the overflow tank of the cylinder, and a flowmeter and a flow control valve are installed in the sludge return pipe of the sludge discharge system at the bottom of the cone-shaped sludge settling shaker; part of the sludge after solid-liquid separation in the precipitation device flows back to the anoxic zone for reprocessing, and part of the sludge is dehydrated and dried; and the supernatant of the solid-liquid separation layer to be precipitated is discharged up to standard.

The precipitated clear water discharging unit includes a precipitation zone 4, the center of which is provided with a central draft tube 19-1, the upper port of which is flush with or higher than the bottom of the nitration liquid collecting tank, and the lower port of which is provided with a conical water baffle 20. The upper periphery of the precipitation tank is provided with an overflow tank and a clear water discharging port; a conical sludge hopper is arranged at the bottom of the precipitation tank, and the bottom of the conical sludge hopper is connected with a sludge discharging pipe along with a sludge discharge valve and a sludge return flow control valve arranged on the sludge discharging pipe; the sludge discharging pipe returns the sludge to the filtrating zone. The treated sewage is discharged through the clear water discharging port 22.

For A/O towers with large sewage treatment capacity and large cylinder cross-sectional zone, it is preferred that the precipitated clear water discharging unit is not arranged in the same tower. A lift pump, carbon source dosing, sewage, sludge, electricity and air supply control facilities are arranged outside the cylinder, and an inlet water flow regulating valve and a flowmeter which are arranged outside the cylinder or attached to the outer wall of the cylinder and are connected with an inlet water sewage port; an anoxic mixed liquid lift pump, a flow regulating valve and a flowmeter connected with the outlet of the anoxic process; fan, lift pump switch and flow frequency conversion control facilities.

In some embodiments, the integrated device also includes a processor, which is communicated and connected with the COD automatic monitoring device, nitrate nitrogen automatic detection device, ammonia nitrogen automatic monitoring device and nitrification liquid ammonia nitrogen automatic monitoring device for determining the control information of carbon source and reflux water volume. Among them, the control information of carbon source can include whether to add carbon source and how much carbon source is added; the control information of the reflux water amount may include whether to increase the reflux water amount and how much it is increased. Among them, the control information of reflux water volume may be determined according to the preset algorithm.

The integrated device in some embodiments is provided with an anoxic zone, a water distributing zone, a filtering zone, a three-phase contact aerobic zone and a precipitated clean water discharge unit. According to the design scale of sewage treatment and the permit of sewage treatment land, 4 or all of the above zones are set in one tower unit. In some embodiments, the anoxic hydrolysis zone is preferably arranged under the ground, and the filtrating zone and three-phase contact aerobic zone are arranged above the ground.

When the above integrated device is adopted to treat nitrogen-containing sewage, only the sewage needs to be lifted once, and the low-pressure fan or fan supplies oxygen and air, which has the advantages of low energy consumption and low noise, and achieves the effect of remarkably improving the load and efficiency of removing pollutants (COD, ammonia nitrogen, total nitrogen, malodorous air, etc.) compared with the existing planar A/O treatment process.

To sum up, compared with the prior art, the device provided by the application has the following advantages:

(1) Oxygen supply effects and treatment effects: 1. Oxygen supply effect: in some embodiments of this descriptions, the three-phase contact air supply method is adopted for oxygen supply, and the boundary oxygen content of biological strains is greatly improved; 2. Treatment effect: the biological microorganisms in the unit grow and reproduce in the oxygen enriched state, which greatly improves the strain density and biological activity of the treatment unit, and can cultivate more dominant strains with high oxygen consumption, strong biological activity and strong pollutant degradation ability, which increases the pollutant removal load per unit volume of the treatment unit, and the effluent COD, ammonia nitrogen and total nitrogen applied to urban sewage treatment plants are better than the pollutant discharge standard for urban sewage treatment plants (GB18718-2002); The effluent COD, ammonia nitrogen and total nitrogen applied to rural biochemical sewage treatment terminals are better than the Discharge Standard Of Water Pollutants For Rural Domestic Sewage Treatment Facilities in Zhejiang Province (DB33/973-2015); the effluent COD, ammonia nitrogen and total nitrogen applied to industrial organic wastewater treatment are better than the class I standard of integrated wastewater discharge standard (GB8978-1996).

Energy consumption: in some embodiments, low-pressure air supply technology is adopted, and the air pressure of the fan is reduced from 40000~70000 Pa to 50-1000 Pa. The low-pressure fan replaces the high-pressure fan, saving about 20-30% of comprehensive energy consumption. There is no need to build a fan room, install an aeration head or aeration pipe, and there will be no noise pollution.

(3) Land occupation of buildings and structures: In some embodiments of this descriptions, the vertical superposition setting technology of each process is adopted to make the aerobic process with an area of about 3 times that of the anoxic process superimposed on the anoxic tank, so as to achieve zero land occupation of the aerobic process; There is no need to build a fan room, thus saving occupied floor space.

(4) Construction costs: in view of the fact that the three-phase contact aerobic (O) zone, filtration zone and water distributing zone of the device all run in the non-ponding condition, the peripheral wall of this zone only needs to bear the air pressure of 50-1,000 Pa, and the peripheral wall is made of ordinary plates or insulation plates such as light-weighted thin-walled metals and plastics, and the peripheral wall has no anti-leakage requirement, so it is assembled by welding, embedding concave-convex grooves into bolts, etc. Therefore, the present disclosure has the advantages of low material costs, quick installation and obvious reduction of comprehensive construction cost.

(5) Comparison of operating environment: 1. Deodorization effect: the anoxia (A) process of the present invention produces ammonia, hydrogen sulfide and odor. The odor rises to the low-pressure air supply chamber and mixes with the air to form a mixed cyclone flow, and the odor is cooperatively input into the upper three-phase contact aerobic zone for biological deodorization, and then contacts with the biological strains in the sewage droplets and the biofilm strains attached to the filler. Aerobic biofilm strains absorb organic plant nutrients in sewage, and oxygen in air is used as respiratory oxygen source to degrade COD and ammonia nitrogen in sewage, and at the same time absorb ammonia, hydrogen sulfide and odor in mixed air, so that ammonia is nitrated into nitrate nitrogen, hydrogen sulfide is oxidized into sulfur, and odor is adsorbed and purified by biofilm, resulting in synergistic odor treatment. The odor concentration at the top of the tower reaches Emission Standard for Odor Pollutants (GB14554-93), with ammonia <1.5 mg/m$^3$, hydrogen sulfide <0.061.5 mg/m$^3$ and odor concentration <20 (dimensionless). If the ammonia, hydrogen sulfide and odor produced in the anoxic (A) process of the existing A/O process exceed the standard, it is necessary to cover and collect them and provide supporting waste air treatment facilities. 2. Noise reduction effect: the present disclosure adopts 50-1000 Pa low-pressure fan to replace 40000-70000 Pa high-pressure blower, and the equipment noise is reduced from originally 80-85 dB to below 60 dB.

The present disclosure provides a method for treating organic sewage in towns, countryside, industry, etc., by adopting the integrated device described above. The method includes the following steps:

The urban and rural domestic sewage to be treated is treated in the anoxic zone, and the water is distributed after the outlet water is lifted and transported, and then discharged through filtration, aerobic treatment, nitrification liquid reflux discharge and sludge precipitation reflux clean water discharge in turn to obtain the treated sewage.

In some embodiments, during anoxic treatment, the sludge concentration of anoxic bacteria is 15-30% V/V; The dissolved oxygen concentration is 0.2-0.6 mg/L; the residence time is 3-8 h, and the concentration of denitrification carbon source is controlled at a C/N ratio of 3:1-5:1.

Perforated pipes are preferably used for water distribution, with hole diameter of 5-10 mm and perforation spacing of 100-200 mm.

The filter material used in filtration is quartz sand; The grain size of the quartz sand is 3-5 mm, and the thickness of the filter layer is 200 mm.

During aerobic treatment, the filler used in aerobic zone is polyurethane sponge; the density of filler is 50-60% V/V; the air pressure in the air supply zone is preferably 50-1000 Pa, more preferably 60-700 Pa; the reflux ratio of nitration solution is 2.0:1-3.0:1.

When the clear water of sludge reflux is discharged and treated, the over-flow speed in the precipitation zone is 0.3-0.4 m/h; The sludge reflux ratio is 35-40%.

In some embodiments, the addition information of carbon source may be determined based on the COD concentration and nitrate concentration of sewage in anoxic zone. Among them, the COD concentration may be obtained by the COD automatic monitoring device, and the nitrate concentration may be obtained by the nitrate automatic monitoring device.

In some embodiments, it is possible to determine whether the carbon source needs to be added by judging whether the ratio of COD concentration to nitrate concentration is less than 4:1-5:1. If the ratio of COD concentration to nitrate concentration is less than 4:1-5:1, the carbon source needs to be added; if not, the carbon source does not need to be added.

In some embodiments, the increase information of the lifting water amount and the return water amount of the anoxic tank may be determined by the first ammonia nitrogen concentration in the sewage in the anoxic zone and the second ammonia nitrogen concentration in the treated sewage of the anoxic zone. Among them, the first ammonia nitrogen concentration may be obtained by the ammonia nitrogen automatic monitoring device set in the anoxic zone, and the second ammonia nitrogen concentration may be obtained by the nitrification liquid ammonia nitrogen automatic monitoring device set in the three-phase aerobic zone.

In some embodiments, it is possible to judge whether the removal effect of ammonia nitrogen meets the preset condition based on the concentration difference between the first ammonia nitrogen concentration and the second ammonia nitrogen concentration, and determine the increase information of the lifting water amount and the reflux water amount of the anoxic tank. If the removal effect of ammonia nitrogen does not meet the preset condition, it is necessary to increase the lifting water amount and the reflux water amount. Among them, the preset condition may be determined according to the design requirements of the processing device.

The reflux water is usually nitrated liquid containing ammonia nitrogen. The increase of reflux water may reduce the COD concentration in anoxic zone, but the concentration of nitrated nitrogen in anoxic zone may not decrease in the same proportion. Therefore, increasing reflux water may make the ratio of COD concentration to nitrate nitrogen concentration lower than 4-5:1. For the above reasons, it is necessary to add carbon source while increasing the amount of reflux water.

When adding carbon source, if the amount of carbon source is too much, it will cause waste; if the amount of carbon source is too little, it may result in insufficient removal effect of ammonia nitrogen, which will increase the amount of reflux water again. In addition, the determination of whether the ratio of COD concentration to nitrate concentration is less than 4:1-5:1 to determine whether to add carbon source is only performed in the process of anoxic zone treatment. Based on the above reasons, the specific value of carbon source addition may be further optimized based on the finishing process.

In some embodiments, the equilibrium optimal solution of carbon source addition and treatment effect may be determined by at least one candidate addition amount of the carbon source (also referred to as at least one candidate carbon source addition amount) and its corresponding at least one predicted concentration difference, and the candidate carbon source addition amount corresponding to the equilibrium optimal solution may be used as the carbon source addition amount.

In some embodiments, the above equilibrium optimal solution may be obtained by the formula $\beta=P_1*M+P_2*N$, so when $\beta$ is the minimum, M and N is regarded as an optimal equilibrium solution. Wherein M is the addition amount of candidate carbon source, and N is the predicted concentration difference corresponding to the addition amount of carbon source; $P_1$ and $P_2$ are judgment coefficients, which represent the importance of carbon source addition or predicted concentration difference in obtaining the equilibrium optimal solution. The more important, the higher the value. Among them, $P_1 \geq 0$ and $P_2 \geq 0$, and $P_1+P_2=1$, $P_1$ and $P_2$ may be set in advance. For example, considering the cost factor, $P_1=0.8$, $P_2=0.2$. The determination coefficient can also be set according to actual needs and other factors.

In some embodiments, the addition amount of at least one candidate carbon source may be obtained by the processor. For example, the processor can obtain the carbon source addition amount in the historical sewage treatment process, arrange the addition amount of at least one historical carbon source from large to small according to the occurrence times, and take the first N historical carbon source additions as the candidate carbon source additions. In some embodiments, several carbon source additions can also be obtained as candidate carbon source additions at a certain time interval. For example, at an interval of 30 minutes, five carbon source additions may be obtained as candidate carbon source additions. In some embodiments, the addition amount of at least one candidate carbon source can also be obtained by the processor in other ways, which may be determined according to the actual circumstance.

In some embodiments, the machine learning model may be used as the prediction model to process each candidate carbon source addition amount and the processing data for multiple time points to determine the predicted concentration difference corresponding to the at least one candidate carbon source addition amount.

In some embodiments, the input of the prediction model may be at least one candidate carbon source addition amount and processing data at a plurality of time points under at least one candidate carbon source addition amount. The processing data corresponding to multiple time points can include COD concentration, nitrate nitrogen concentration, carbon source addition amount, first ammonia nitrogen concentration, second ammonia nitrogen concentration and reflux water volume. Among them, the return water may be obtained through the sewage valve and flowmeter. The output of the prediction model may be the concentration difference.

The types of prediction model may be various. In some embodiments, the type of prediction model may be LSTM model or other models that can realize the same function.

In some embodiments, the prediction model may be obtained from a plurality of labeled training samples. For example, a number of labeled training samples may be input into the initial prediction model, a loss function may be constructed by the labels and the results of the initial prediction model, and the parameters of the initial prediction model may be iteratively updated based on the loss function. When the loss function of the initial prediction model meets the preset condition, the model training is completed, and the trained prediction model is obtained. Among them, the preset condition may be that the loss function converges, the number of iterations reaches the threshold, etc.

In some embodiments, the training samples may at least include COD concentration, nitrate nitrogen concentration, carbon source addition amount, first ammonia nitrogen concentration, second ammonia nitrogen concentration and reflux water amount. The label may be the concentration difference between the first ammonia nitrogen concentration and the second ammonia nitrogen concentration. Labels may be obtained based on historical data or manually labeled.

Sewage treatment is a continuous and dynamic process, so the data of each time point is actually influenced by the data of the previous time point. In some embodiments, the LSTM model can reflect the influence of the data before the time point to be predicted on the result, and the number of time points before the time point may be flexibly selected according to the actual situation. In this way, the amount of carbon sources may be better selected, the cost may be better controlled, and the efficiency of sewage treatment may be improved. Using the joint prediction of carbon source addition and concentration difference, considering the two factors of carbon source dosage and ammonia nitrogen removal effect, starting from the whole sewage treatment, the relations between treatment effect and treatment cost can be better balanced, making the treatment cost more reasonable and ensuring the treatment effect.

In some embodiments, the organic sewage containing COD and nitrogen to be treated includes one or more of the organic sewage containing COD and nitrogen produced in towns, rural areas, gathering zones and industries.

For further explanation, an A/O tower integrated device for biological treatment of nitrogen-containing organic sewage and method for treating nitrogen-containing organic sewage by using the same provided by some examples in this descriptions will be described in detail below, but they cannot be understood as limiting the scope of protection.

Embodiment 1

In some embodiments, the integrated device above may be adopted to treat rural domestic sewage in the way below:

(I) general information: 1. treating objects: rural domestic sewage; 2. treating scale: 30 t/d; 3. Equipment name: the A/O tower nitrogen-containing organic sewage treatment integrated machine mentioned in the above technical scheme; 4. equipment treatment process: there are five processes in the integrated machine, namely anoxia (A), water lifting and distributing, filtrating, three-phase contact aerobic (O), sludge precipitation reflux and clear water discharging;

(II) Main technical parameters:

1. Parameters of anoxic (A) tank: the duration is 4 h, and the C/N ratio of denitrification carbon source is 3:1-5:1; the anoxic sludge concentration is 15-30% V/V, dissolved oxygen is 0.2-0.6 mg/L, and the sludge is stirred by hydraulic stirring.

2. Parameters of water lifting and distributing: lifting flow 5 $m^3$/h, lift 10 m, power 0.75 KW; water distributor: water is distributed through perforated pipes, with the perforation aperture of 5 mm and the perforation spacing of 100 mm, and the height of the water distributing device from the lower filter layer is 200 mm;

Parameters of filter layer: the filter material is quartz sand, with a particle size of 3-5 mm and a filter layer thickness of 200 mm;

Three-phase contact aerobic (O) parameters: the duration is 8 h, biological filler is made of polyurethane sponge, filler installation density is 55% (V/V), low-pressure fan air pressure is 60 Pa, air volume is 5000 $m^3$/h, power is 0.38 KW, and nitrification liquid reflux ratio is 3:1;

Parameters of precipitation tank: the overflow speed in precipitation zone is 0.4 m/h, and the sludge reflux ratio is 35%;

(3) Treatment effect (average of laboratory test statistics in one month).

The raw water before treatment: COD: 96.2 mg/l, ammonia nitrogen 38.1:mg/L, total nitrogen: 45.6 mg/L and total phosphorus: 2.23 mg/L;

Discharged water after treatment: COD: 38.7 mg/l, removal rate: 59.77%; the ammonia nitrogen: 4.24 mg/L, and the removal rate: 88.87%; total nitrogen: 12.6 mg/L, removal rate: 72.37%; total phosphorus: 0.88 mg/L, removal rate: 60.54%;

The Discharge Standard of Rural Domestic Sewage (no national standard, all provinces and cities) stipulates COD of 30-80 mg/L, ammonia nitrogen of 1.5-15 mg/L, total nitrogen of 15-20 mg/L and total phosphorus of 0.30-2 mg/L;

Test results of odor emission from the top of the cylinder: the odor concentration is 16 (dimensionless), which is superior to Class II zone of Emission Standard for Odor Pollutants, and the odor concentration limit is 20 (dimensionless).

Embodiment 2

(I) General information: 1. Treatment object: dairy product processing waste water; 2. Treatment scale: 20 t/d; 3. equipment name: the A/O tower nitrogen-containing organic sewage treatment integrated machine mentioned in the above technical scheme; 4. Equipment treatment process: there are five processes in the integrated machine: anoxia (A), water lifting and distributing, filtrating, three-phase contact aerobic (O), and sludge precipitation reflux and clear water discharge;

(2) Main technical parameters:

1. The parameters of anoxic (A) tank: duration: 6 h, and the C/N ratio of denitrification carbon source is 3:1-5:1; the concentration of anaerobic sludge: 20-30% V/V, the dissolved oxygen: 0.2-0.4 mg/L, and the sludge is stirred by hydraulic stirring.

2. Water lifting and distributing parameters: lifting flow: 5 m$^3$/h, lift: 10 m, power: 0.75 KW; water distributor: water is distributed by perforated pipes, with perforation aperture of 5 mm and perforation spacing of 100 mm, and the vertical height of the water outlet of the water distributor from the lower filter layer is 200 mm;

3. Filtering layer parameters: filter material: quartz sand, particle size: 3-5 mm, filter layer thickness: 200 mm;

4. Three-phase contact aerobic (O) parameters: duration: 12 h, biological filler material: polyurethane sponge, filler installation density: 55% (V/V), low-pressure fan air pressure: 60 Pa, air volume: 5000 m$^3$/h, power: 0.38 KW, nitrification liquid reflux ratio: 3:1;

5. Parameters of precipitation tank, flow velocity in precipitation zone: 0.30 m/h, sludge reflux ratio: 40%;

(C) Treatment effect (laboratory test statistics average in one month)

Raw water before treatment: COD: 510.6 mg/L, ammonia nitrogen: 66.2 mg/L, total nitrogen: 67.5 mg/L, total phosphorus: 2.10 mg/L.

Discharged water after treatment: COD: 89.4 mg/L, removal rate: 82.50%; ammonia nitrogen: 12.4 mg/L, removal rate: 81.3%; total nitrogen: 20.2 mg/L, removal rate: 70.1%; total phosphorus: 0.82 mg/L, removal rate: 61.0786%.

Comprehensive Wastewater Discharge Standard (GB8978-1996) Class I standard: COD: 100 mg/L, ammonia nitrogen: 15 mg/L, total nitrogen: 22.7 mg/L, phosphate: 0.30 mg/L.

Test results of odor emission from the top of the cylinder: odor concentration: 16 (dimensionless), which is better than that of Class II of Emission Standard for Odor Pollutants; odor concentration limit: 20 (dimensionless).

Embodiment 3

In some embodiments, the integrated device above may be adopted to treat industrial and domestic sewage in towns in the way below:

(I) General information: 1. Treating object: comprehensive sewage of urban industrial life; 2. Treatment scale: 10,000 t/d; 3. Equipment name: the three-phase contact A/O tower mentioned in the above technical scheme; 4. Equipment treatment process: the A/O tower is equipped with four processes: anoxia (A), water lifting and distributing, filtrating and three-phase contact aerobic (O);

(2) Main technical parameters:

1. Parameters of anoxic (A) tank: duration: 3 h, and the C/N ratio of denitrification carbon source is 3:1-5:1; the concentration of anaerobic sludge: 20-30% V/V, dissolved oxygen: 0.2-0.6 mg/L, and four submersible mixers are used for sludge mixing.

2. Parameters of water lifting and distributing zone: lift pump flow: 270 m$^3$/h, 2 pumps, lift 14 m, and power of each pump: 15 KW; water distributor: water is distributed by perforated pipes, with perforation aperture of 10 mm and perforation spacing of 200 mm, and the height of the water distributor from the lower filter layer is 500 mm;

3. Filter layer parameters: filter material: quartz sand, particle size: 3-5 mm, filter layer thickness: 200 mm;

4. Three-phase contact aerobic (O) parameters: duration: 9 h, biological filler material: polyurethane sponge, filler installation density: 55% (V/V), 5 low-pressure fans, air pressure: 180 Pa, air volume: 10,000 m$^3$/h, single power: 0.75 KW, nitrification liquid reflux ratio: 2.5:1.

5. Parameters of precipitation tank: overflow speed in precipitation zone: 0.40 m/h, sludge reflux ratio: 40%;

(3) Treatment effect (average of laboratory test statistics in one month)

The raw water before treatment: COD: 114.12 mg/L, ammonia nitrogen: 11.38 mg/L, total nitrogen: 41.73 mg/L and total phosphorus: 0.87 mg/L;

Discharged water after treatment: COD: 56.8 mg/l, removal rate: 82.50%; ammonia nitrogen: 4.84 mg/L, removal rate: 74.43%; total nitrogen: 9.16 mg/L, removal rate: 78.05%; total phosphorus: 0.52 mg/L, removal rate: 40.02%;

Class A standard of Pollutant Discharge Standard for Urban Sewage Treatment Plants (GB18918-2002): COD: 60 mg/L, ammonia nitrogen: 5 mg/L, total nitrogen: 15 mg/L and total phosphorus: 2.0 mg/L;

Test results of odor emission from the top of the cylinder: odor concentration: 16 (dimensionless), which is better than that of Class II of Emission Standard for Odor Pollutants; odor concentration limit: 20 (dimensionless).

It may be seen from the above embodiments, that the present disclosure provides an A/O tower integrated device for biological treatment of organic sewage containing COD and nitrogen, which includes a cylinder; a water distributing zone, a filtrating zone, a three-phase contact aerobic zone, a nitrification liquid reflux discharging zone and an anoxic zone are sequentially arranged in the cylinder from top to bottom; the three-phase contact aerobic zone is a normal-pressure high-oxygen biofilm filling zone in a non-ponding water zone; a sewage inlet is arranged in the anoxic zone; the water outlet of the anoxic zone is communicated with the water inlet of the water distributing zone. The device integrates functional zones such as water distribution, filtration, three-phase contact aerobic, nitration liquid reflux discharge and anoxia, thus saving the occupied zone. The unit volume pollutant removal load of the device is high. Aerobic zone can cooperatively treat odor produced in anoxic zone. The removal rate of COD, ammonia nitrogen and total nitrogen is high.

The above is only the preferred embodiment of the present invention, and it should be pointed out that for those of ordinary skill in the art, without departing from the principle of the present invention, several improvements and embellishments may be made, and these improvements and embellishments should also be regarded as falling in protection scope of the present invention.

What is claimed is:

1. An integrated device for treatment of organic sewage, comprising: a water distributing zone, a filtrating zone, a three-phase contact aerobic zone, a nitrification liquid reflux discharging zone, a precipitated clear water discharging unit, and an anoxic zone; wherein the water distributing zone, the filtrating zone, the three-phase contact aerobic zone, the nitrification liquid reflux discharging zone and the anoxic zone are sequentially arranged in a cylinder body from top to bottom; a sewage inlet is arranged in the anoxic zone, and a water outlet of the anoxic zone is communicated with the water distributing zone; the three-phase contact aerobic zone is a non-ponding zone and an atmospheric pressure high oxygen biofilm filling zone; and the precipitated clear water discharging unit is arranged in the cylinder body, and a nitration liquid reflux discharging zone in the cylinder body comprises a nitration liquid collecting tank; wherein a bottom of the nitration liquid collecting tank is provided with an exhaust-nitrification liquid draft tube and a central guide cylinder; the central guide cylinder leads part of nitration liquid into the precipitated clear water discharging unit; and the exhaust-nitrification liquid draft tube discharges air in the anoxic zone to a vortex air supply zone, and guides another part of nitration liquid back to the anoxic zone.

2. The integrated device according to claim 1, wherein the three-phase contact aerobic zone comprises: the vortex air supply zone, which is communicated with the nitration liquid reflux discharging zone, wherein a low-pressure fan is arranged on a cylinder wall corresponding to the vortex air supply zone to provide low-pressure air for the vortex air supply zone; and an aerobic zone, which is positioned right above the vortex air supply zone.

3. The integrated device according to claim 1, further comprising:
a Chemical Oxygen Demand (COD) automatic monitoring device, arranged in the anoxic zone and used for monitoring COD concentration of the organic sewage in the anoxic zone;
a nitrate nitrogen automatic monitoring device, arranged in the anoxic zone and used for monitoring nitrate nitrogen concentration of the organic sewage in the anoxic zone.

4. The integrated device according to claim 3, further comprising:
an ammonia nitrogen automatic monitoring device, arranged in the anoxic zone and used for monitoring first ammonia nitrogen concentration in the organic sewage in the anoxic zone; and
a nitrification liquid ammonia nitrogen automatic monitoring device, arranged in the three-phase contact aerobic zone and used for monitoring second ammonia nitrogen concentration in the sewage after anoxic treatment in the anoxic zone.

5. The integrated device according to claim 4, further comprising a processor, wherein the processor is communicated and connected with the COD automatic monitoring device, nitrate nitrogen automatic monitoring device, ammonia nitrogen automatic monitoring device and nitrification liquid ammonia nitrogen automatic monitoring device, and the processor is used to determine control information of carbon source and reflux water volume.

6. The integrated device according to claim 1, wherein the precipitated clear water discharging unit is arranged between the nitrification liquid reflux discharging zone and the anoxic zone;
the precipitated clear water discharging unit is provided with a sludge discharging port and a sludge discharging pipe;
the sludge discharging pipe is connected with the sludge discharging port, and is provided with an excess sludge discharging port and a reflux sludge control valve; and
the reflux sludge control valve transmits a reflux sludge and the organic sewage treated in the anoxic zone to the water distributing zone.

7. The integrated device according to claim 1, wherein the filtrating zone is one of a filter material particle filter layer, a mesh filter plate or a porous filter plate;
the filter material of the filter material particle filter layer is one of quartz sand, ordinary sand or granular activated carbon, and the particle size of the filter material is 3-50 mm and the thickness is 50-300 mm.

8. The integrated device according to claim 1, wherein the precipitated clear water discharging unit is arranged in the cylinder body, and an inner wall of the cylinder body of the precipitated clear water discharging unit is provided with an annular overflow tank; and
an outer wall of the cylinder body corresponding to the annular overflow tank is provided with a clear water discharging port.

9. A method for treating organic sewage by using the integrated device according to claim 1, comprising: introducing the organic sewage to be treated into the anoxic zone for treatment, lifting and transporting effluent from the anoxic zone to the water distributing zone, and obtaining the treated sewage through filtration, aerobic treatment, nitrification liquid reflux discharging and sludge precipitated clear water discharging successively.

10. The integrated device according to claim 1, wherein biofilm in the three-phase contact aerobic zone is exposed in air.

11. The integrated device according to claim 1, wherein the anoxic zone is connected with the water distributing zone through a pipeline, and a lifting device for lifting the organic sewage is arranged on the pipeline.

12. The integrated device according to claim 1, wherein the water distributing zone includes a water distributing device, and the water distributing device is arranged to make the organic sewage drip evenly to a filtering zone.

13. The integrated device according to claim 1, wherein an oxygen concentration of the three-phase contact aerobic zone is 23-26%.

14. The integrated device according to claim 5, wherein the processor is configured to determine addition information of the carbon source when a ratio of the COD concentration to the nitrate nitrogen concentration is lower than 4:1-5:1.

15. The integrated device according to claim 5, wherein the processor is configured to judge whether a removal effect of ammonia nitrogen in the organic sewage meets a preset condition based on a difference between the first ammonia nitrogen concentration and the second ammonia nitrogen concentration, and determine increase information of a lifting water quantity and the reflux water volume of a anoxic tank in response to the judgement that the removal effect of ammonia nitrogen in the organic sewage does not meet the preset condition.

* * * * *